(12) United States Patent
Wang et al.

(10) Patent No.: US 10,095,292 B2
(45) Date of Patent: Oct. 9, 2018

(54) LINEAR LOAD TRANSITION BETWEEN POWER SUPPLIES AND BATTERY BACKUP UNITS

(71) Applicant: Dell Products, L.P., Round Rock, TX (US)

(72) Inventors: Lei Wang, Austin, TX (US); Mehran Mirjafari, Austin, TX (US); Kunrong Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 92 days.

(21) Appl. No.: 15/260,749

(22) Filed: Sep. 9, 2016

(65) Prior Publication Data

US 2018/0074561 A1   Mar. 15, 2018

(51) Int. Cl.
| | |
|---|---|
| G06F 9/00 | (2006.01) |
| G06F 1/26 | (2006.01) |
| H02J 9/06 | (2006.01) |
| G06F 1/30 | (2006.01) |
| G06F 1/32 | (2006.01) |

(52) U.S. Cl.
CPC ............... *G06F 1/263* (2013.01); *G06F 1/30* (2013.01); *G06F 1/3212* (2013.01); *H02J 9/061* (2013.01)

(58) Field of Classification Search
CPC ....................................................... G06F 1/263

USPC ............ 320/115; 307/64; 361/93.9; 713/340, 713/300

See application file for complete search history.

(56) References Cited

U.S. PATENT DOCUMENTS

| | | | | |
|---|---|---|---|---|
| 7,689,852 B2* | 3/2010 | Hwang | ..................... | G06F 1/28 713/300 |
| 8,125,194 B2* | 2/2012 | Nethken | ............... | H02J 7/0027 320/115 |
| 8,582,268 B2* | 11/2013 | Yamamoto | ............ | H01M 10/44 361/93.9 |
| 8,943,338 B2* | 1/2015 | Jau | ............................. | G06F 1/30 307/64 |
| 2009/0049322 A1* | 2/2009 | Chang | ..................... | G06F 1/263 713/340 |

\* cited by examiner

*Primary Examiner* — Aurel Prifti
(74) *Attorney, Agent, or Firm* — Fogarty LLP (57) ABSTRACT

Systems and methods for achieving a linear load transition between power supplies and battery units are described. In some embodiments, a system may include a Power Supply Unit (PSU) coupled to an Information Handling System (IHS) via a power transmission interface; a Backup Battery Unit (BBU) coupled to the IHS via the power transmission interface in parallel with the PSU; and a controller within the BBU. The controller may be configured to determine that the PSU has turned off; allow the BBU to supply all current consumed by the IHS via the power transmission interface while the PSU is turned off; detect that the PSU has turned back on; and in response to the detection, reduce an internal reference of the BBU such that an output current of the BBU is decreased linearly and an output current of the PSU is increased linearly.

20 Claims, 7 Drawing Sheets

FIG. 6 ical,092 # LINEAR LOAD TRANSITION BETWEEN POWER SUPPLIES AND BATTERY BACKUP UNITS

FIELD

This disclosure relates generally to Information Handling Systems (IHSs), and more specifically, to systems and methods for achieving a linear load transition between power supplies and battery backup units.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

There is a trend to deploy low-voltage Battery Backup Units (BBUs) inside an IHS as a distributed Uninterruptible Power Supply (UPS), therefore replacing traditional central AC UPS systems. In the event of an AC power interruption, the battery backup unit (BBU) may take over the load of the IHS (i.e., equipment that is powered by the BBUs and power supply units or "PSUs") in real time and maintain continuous powering of the IHS for a period of time sufficient to switch over to an alternative power source or to complete an orderly shutdown.

Once the AC power source or the alternative power source (usually a backup generator) is up and ready, the load is transferred from all the BBUs back to the PSUs powered by the AC power sources. If such a power transfer happens simultaneously across all IHSs in the data center, however, the abrupt heavy loading (typically in the order of less than one second) can be much faster than the inertia/response speed of a backup generator and may overload the backup generator, leading to its shutdown.

A conventional approach to avoiding such an overloading and shutdown includes adopting a randomized transition at data center level—i.e., each IHS's power transfer is initiated at a randomized time within, for instance, a 10-second window. In this way, the aggregated loading at the data center level is increased gradually and progressively. Depending on the outage time, this transition time period may be programmed differently. However, even with such schemes, load transition on each individual IHS still happens abruptly.

Controlled load transition techniques—that is, reloading the AC line/backup generator incrementally after operating on battery power—are referred to as "walk-in," which is defined in various specifications. For example, some specifications may define that a walk-in ramp shall not present input power steps greater than 200 W per second on the PSU AC cord input to a 1,600 W PSU, which means that the whole period of walk-in for all the PSUs is around 10 seconds. In some cases, conventional walk-in transitions may be implemented within a battery backup function inside every PSU, and the battery is interfaced with the PSU circuits at the primary 800 V bus point. In those cases, the linear load ramp or walk-in process mostly relies upon the internal control within each PSU.

The inventors hereof have recognized, however, that in more general applications (e.g., large data centers), PSUs and BBUs may be housed in separated units and placed in parallel operation with and output DC bus (such as 12 V bus, or the like). Moreover, in some cases, there may not be a current sharing bus connecting every PSU to every BBU, and therefore communications over such a bus are not possible. To address these, and other concerns, the inventors hereof have developed systems and methods for achieving a linear load transition between PSUs and BBUs as described herein.

SUMMARY

Embodiments of systems and methods for achieving a linear load transition between power supplies and battery units are described herein. In an illustrative, non-limiting embodiment, a system may include a Power Supply Unit (PSU) coupled to an Information Handling System (IHS) via a power transmission interface; a Backup Battery Unit (BBU) coupled to the IHS via the power transmission interface in parallel with the PSU; and a controller within the BBU, the controller configured to: determine that the PSU has turned off; allow the BBU to supply all current consumed by the IHS via the power transmission interface while the PSU is turned off; detect that the PSU has turned back on; and in response to the detection, reduce an internal reference of the BBU such that an output current of the BBU is decreased linearly and an output current of the PSU is increased linearly. In various embodiments, the internal reference of the BBU may be a current or a voltage reference.

In order to determine that the PSU has turned off and to detect that the PSU has turned back on, the controller may be configured to monitor the status of a digital signal provided by a logic circuit distinct from the BBU and the PSU. The controller may be further configured to, in response to the determination, raise an internal voltage reference of the BBU to a value greater than an internal voltage reference of the PSU. The controller may be further configured to begin raising the internal reference of the BBU after waiting for a predetermined period of time greater than a hold up time of the PSU. The controller may be further configured to shut down the BBU in response to the output current of the BBU reaching a minimum value.

In another illustrative, non-limiting embodiment, a memory storage device may have program instructions stored thereon that, upon execution by a controller within a BBU of an IHS, cause the BBU to: determine that a PSU has turned off; supply all current consumed by the IHS while the PSU is turned off; detect that the PSU has turned back on; and in response to the detection, reduce an internal reference of the BBU such that an output current of the BBU is decreased linearly and an output current of the PSU is increased linearly.

In yet another illustrative, non-limiting embodiment, a method performed by a controller within a BBU of an IHS may include determining that a PSU has turned off; supplying all current consumed by the IHS while the PSU is turned off; detecting that the PSU has turned back on; and in response to the detection, reducing an internal voltage reference of the BBU such that an output current of the BBU is decreased linearly and an output current of the PSU is increased linearly.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
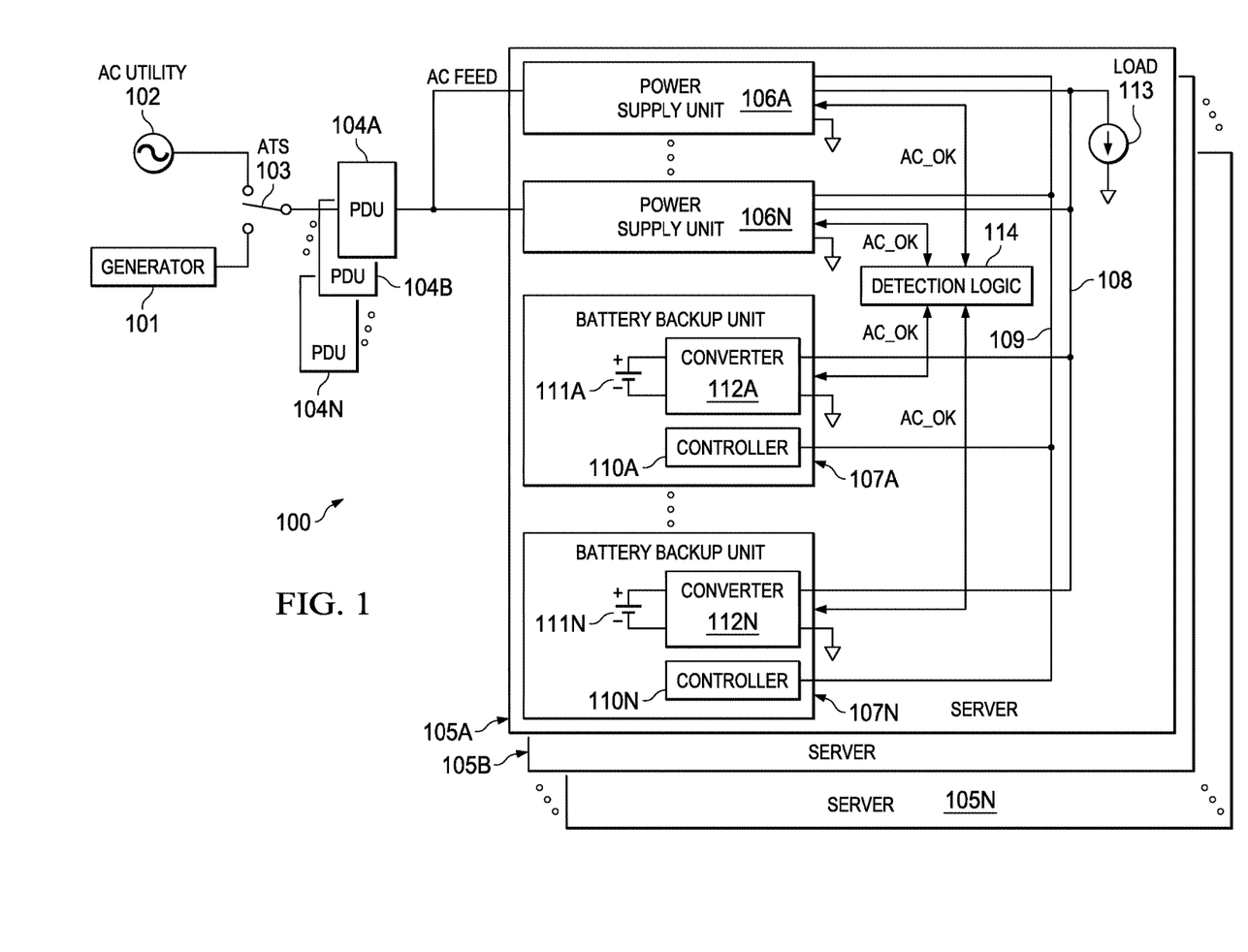
FIG. 1 is a block diagram of an example of a system for achieving linear load transitions between Power Supply Units (PSUs) and Battery Backup Units (BBUs) according to some embodiments.

FIG. 1 is a block diagram of an example of system 100 for achieving linear load transitions between Power Supply Units (PSUs) 106A-N and Battery Backup Units (BBUs) 107A-N. In various embodiments, system 100 may be used, for example, to power a plurality of Information Handling Systems (IHSs) 105A-N.

Particularly, AC utility 102 (e.g., 208 V) and backup generator 101 are coupled to Power Distribution Units (PDUs) 104A-N via at least one automatic transfer switch (ATS) 103. Each PDU 104 is coupled to a corresponding one of IHSs 105A-N such that an AC feed, whether from AC utility 102 or generator 101, is provided to PSUs 106A-N within each of IHSs 105A-N. The electrical load presented by each IHS 105 is symbolically represented by a lump sum system load 113, which is coupled to each PSU 106 (coupled to each other in parallel) via power transmission interface or bus 108.

Each IHS 105 further includes a plurality of BBUs 107A-N. Each BBU 107 includes a corresponding DC battery 111A-N, converter 112A-N, and controller 110A-N (described in FIG. 2). Each of BBU 107 is also coupled to load 113 via power transmission bus 108. In a few cases, each BBU 107 may be coupled in parallel to each PSU 106 via optional current sharing bus 109.

Particularly, when optional current sharing bus 109 is present, one or more of PSUs 106A-N and/or BBUs 107A-N may be configured to output a current sharing signal ($I_{OUT}$) onto optional current sharing bus 109 that is indicative of the PSU's or BBU's output current being supplied to system load 113 via power transmission interface or bus 108. The amplitude of this signal is proportional to the current supplied by its corresponding PSU or BBU. Optional current sharing bus 109 may also be monitored by each PSU and BBU for control purposes, which may in turn implement other load transition techniques that are different from those described herein.

In a wide variety of situations, no matter optional current sharing bus 109 is either absent or not available to one or more of PSUs 106A-N and/or BBUs 107A-N, the systems and methods described below for achieving a linear load transition between PSUs 106A-N and/or BBUs 107A-N may be used. These systems and methods may be used to as a primary linear load transition mechanism, no matter whether current sharing bus 109 is available.

Still referring to FIG. 1, detection logic 114 is located at the system to make the AC_OK signal bi-directional. For example, many techniques described herein may be implemented in response to the AC_OK signal being de-asserted when a PSU detects that its AC feed has lost power.

In operation, every time the AC feed is lost (e.g. due to failure of AC utility 102 and/or generator 101) and the AC_OK signal is at a logic low (or high, depending upon the implementation), BBU 107 (one or more of BBUs 107A-N) takes over the system load 113 and provides all of the current required by that load. After a predetermined time delay approximately equal to PSU 107's hold up time (that is, the amount of time PSU continues to provide current to load 113 even after the AC power is lost; typically of the order of ~10 ms), BBU 107 increases its reference voltage or current to a higher value (e.g., from 12 V to 12.4 V).

Later, when AC power is back, BBU 107 receives the AC_OK signal from PSU 106 (one or more of PSUs 106A-N) now at a logic high (or low, depending upon the implementation), which means that PSU 106 is back on and ready to supply at least some current to load 113. In response, BBU 107 waits another time interval (e.g., 500 ms) and then begins to decrease its internal reference voltage or current in the form of a linear ramp, thereby causing BBU 107's output current to decrease linearly. As the output current provided by BBU 107 decreases, the output current provided by PSU 106 increases, also linearly, in response thereto.

Accordingly, various techniques described herein are based in part upon intentionally changing the value of BBU 107's internal reference voltage or current, for example, by decreasing its magnitude linearly during the walk-in period which may last, for instance, approximately ~10 seconds (or whatever the application requirements may be). Moreover, during this walk-in period, controller 110 of BBU 107 prevents the internal voltage reference of BBU 107 from increasing. After the internal reference current or voltage reaches a minimum threshold value (e.g., 0 A or 10 V), BBU 107 is shut down and potentially recharged in anticipation of a subsequent AC loss event.

Figure 2:
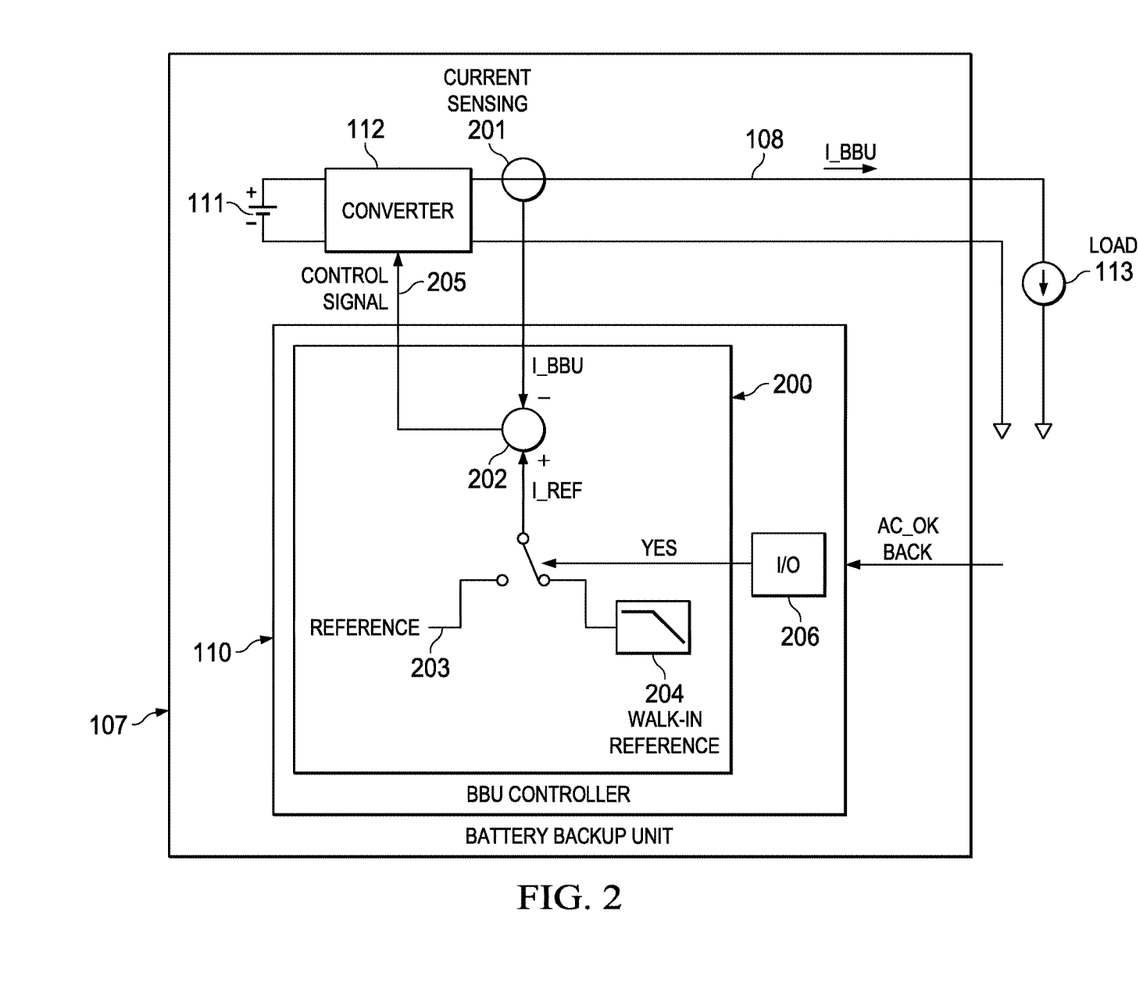
FIG. 2 is a block diagram of an example of a controller configured to effect linear load transitions according to some embodiments.

FIG. 2 is a block diagram of an example of controller 110 configured to effect a linear load transition, as described herein. In some embodiments, controller 110 may be implemented within BBU 107, as described in connection with FIG. 1. In this case, controller 110 includes reference control circuit 200, which operates based upon the status of AC_OK signal received through input/output (I/O) circuitry 206.

In operation, circuit 200 selects between two internal reference values: reference 203 and walk-in reference 204. When AC_OK is at a logic high, circuit 200 selects reference 203. When AC_OK is at a logic low, circuit 200 selects walk-in reference 204. Summer 202 receives a signal from current sensing element 201 that is indicative of the output current being provided by BBU 107 to load 113 via bus 108, adds it to the selected reference, and provides that sum to converter 112 as control signal 205. Control signal 205 is in turn used by converter 112 to control the output current (I_BBU) provided to load 113 proportionally thereto.

Figure 3:
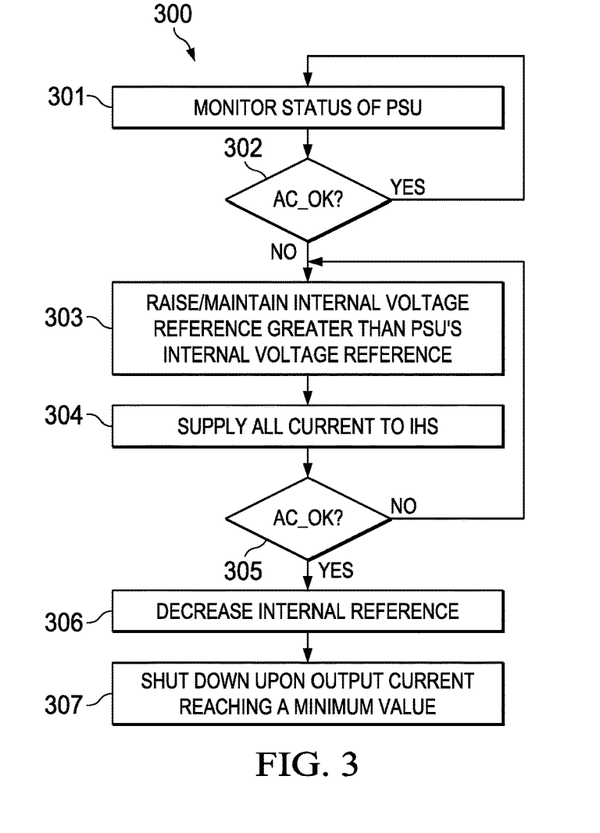
FIG. 3 is a flowchart of an example of a method for achieving linear load transitions according to some embodiments.

To illustrate the operation of circuit 200, FIG. 3 is a flowchart of an example of method 300 for achieving a linear load transition from the perspective of BBU controller 110. At block 301, method 300 includes monitoring the status of PSU 106. At block 302, if the AC_OK signal indicates that PSU 106 is online (e.g., at a logic high), control returns to block 301. Otherwise, if the AC_OK signal indicates that PSU 106 is offline (e.g., at a logic low), block 303 raises an internal voltage reference of BBU 107 to a value greater than PSU 106's internal voltage reference.

At block 304, BBU 107 supplies all of the current consumed by load 113. Then, at block 305, if the AC_OK signal indicates that PSU 106 is still down (e.g., AC power has not been restored), control returns to block 303. Otherwise, if the AC_OK signal indicates that PSU 106 is up and ready to supply current to load 113, a walk-in period begins.

During the walk-in period, method 300 decreases the internal reference linearly, for instance, in the form of a downward ramp. As a consequence, the output current provided by BBU 107 is also decreased, and PSU 106 begins to make up for that decrease in a similarly linear fashion. Once the internal reference of BBU 107 reaches zero (or some other predetermined value), PSU 106 is now providing all of load 113's current requirements and BBU 107 may shut down.

As mentioned before, operation 303 may include waiting for a first predetermined amount of time (e.g., the PSU's hold up time) before raising the internal reference of BBU 107. When in normal operation, the internal reference of BBU 107 is generally the same as the internal reference of PSU 106. By increasing the internal reference of BBU 107 upon detection of a change in the AC_OK signal to a value greater than PSU 106's internal reference, however, method 300 reduces the likelihood that PSU 106 will start providing current to load 113 too soon. Similarly, block 306 may include waiting for a second predetermined amount of time before lowering the internal reference of BBU 107 in the form of the downward ramp.

Figure 4:
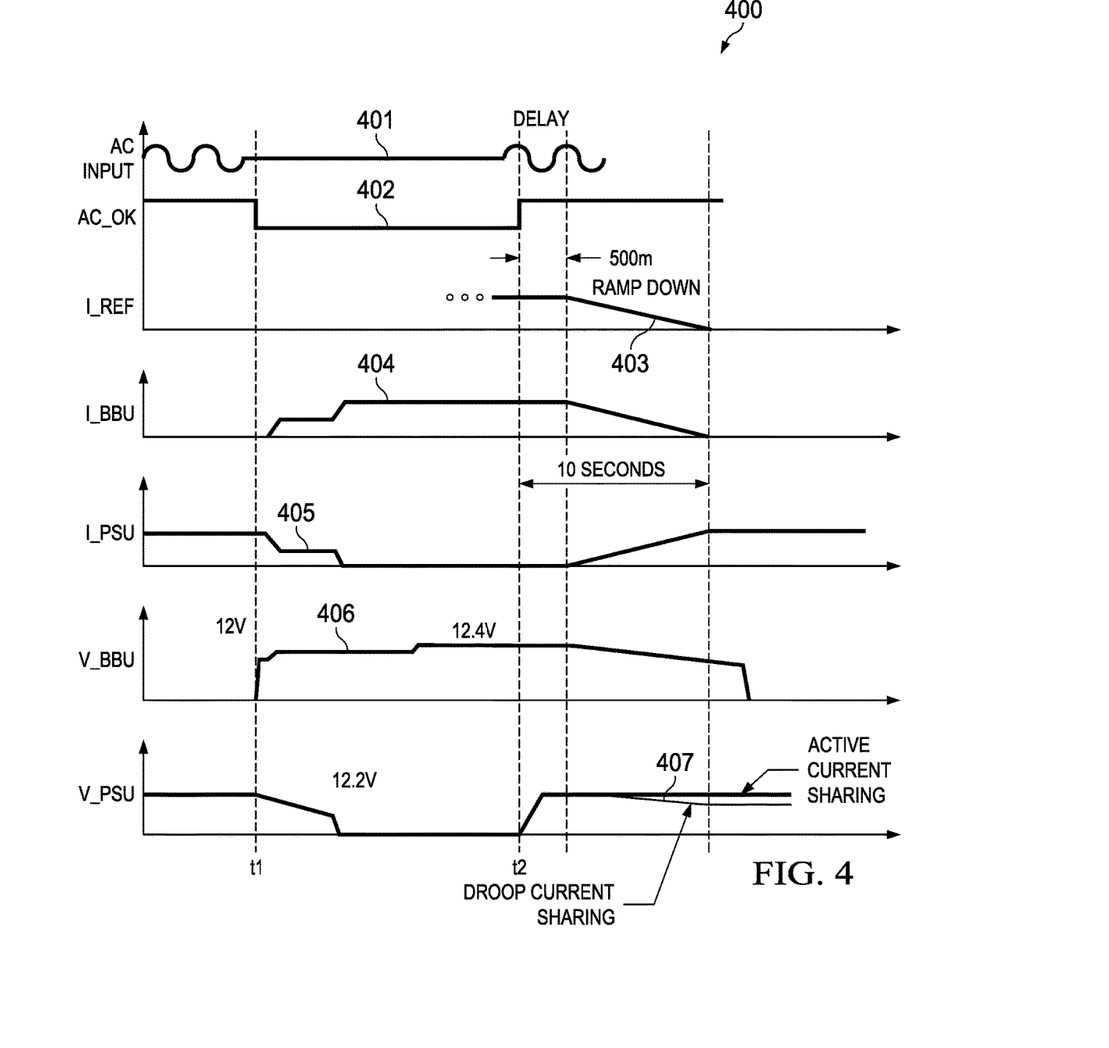
FIG. 4 is a timing diagram illustrating signals involved in the operation of a system for achieving linear load transitions according to some embodiments.

To further illustrate the foregoing, FIG. 4 shows timing diagram 400 illustrating signals involved in the operation of a system for achieving a linear load transition. The timeline of the events for this solution may be explained as follows. Curve 401 shows that AC power is provided normally until it ceases at t1 and returns at approximately t2. Accordingly, AC_OK 402 is asserted prior to t1, de-asserted between t1 and t2, and again asserted after t2.

After a first delay from t1, or when the PSU is shut down (AC_OK de-asserted) and BBU 107 takes over all of the current required by load 113, BBU 107 raises its internal voltage reference, shown as V_BBU curve 406, to a value (e.g., 12.4 V) higher than PSU 106's internal voltage reference (e.g., 12.2 V). When AC comes back on at t2 and PSU 106 becomes alive, it initially does not provide any current to load 113 because of its lower output voltage in comparison to BBU 107's output voltage, as illustrated in curve 405.

After a second delay from t2 (e.g., 500 ms), which accounts for variations in the PSU's start up time between different vendors, BBU 107 starts to ramp down its internal current reference 403, with the beginning value being its current value at that time. The slope of this ramp down may be selectable to reach zero within the allocated walk-in time (e.g., 10 seconds). Once the output current of BBUs 404 reaches zero, BBU 107 shuts down. Generally, method 300 may be applied concurrently with, or in lieu of, any current sharing mechanism employed by PSU 106 or BBU 107.

In some embodiments, for the transition around t1 (after PSU 106 goes down), the reference being manipulated may be a voltage reference only. In contrast, although the foregoing example describes the transition around t2 as a ramping down of a current reference, it should be noted that a voltage reference may be used instead.

Figure 5:
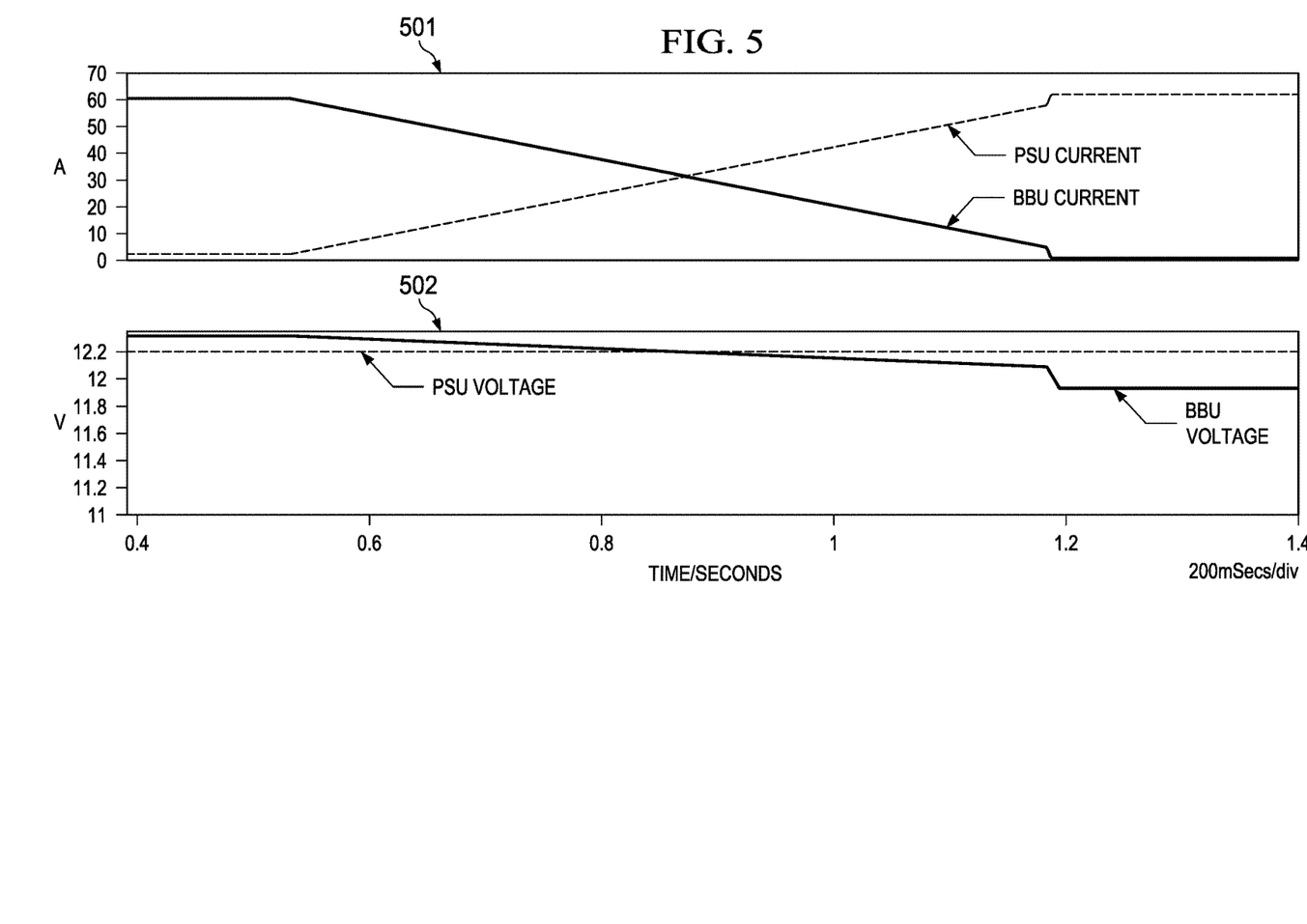
FIG. 5-7 are graphs illustrating simulated linear load transitions according to some embodiments.
Figure 6:
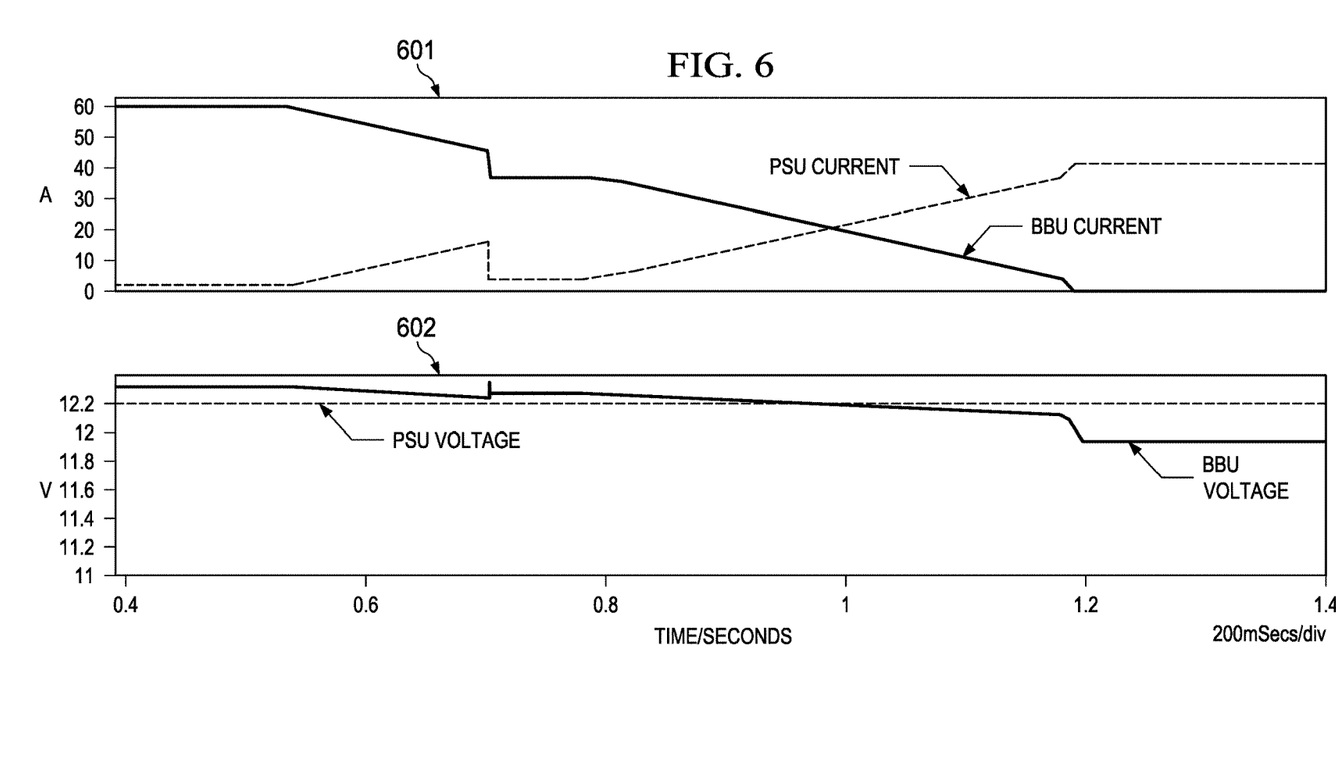
Figure 7:
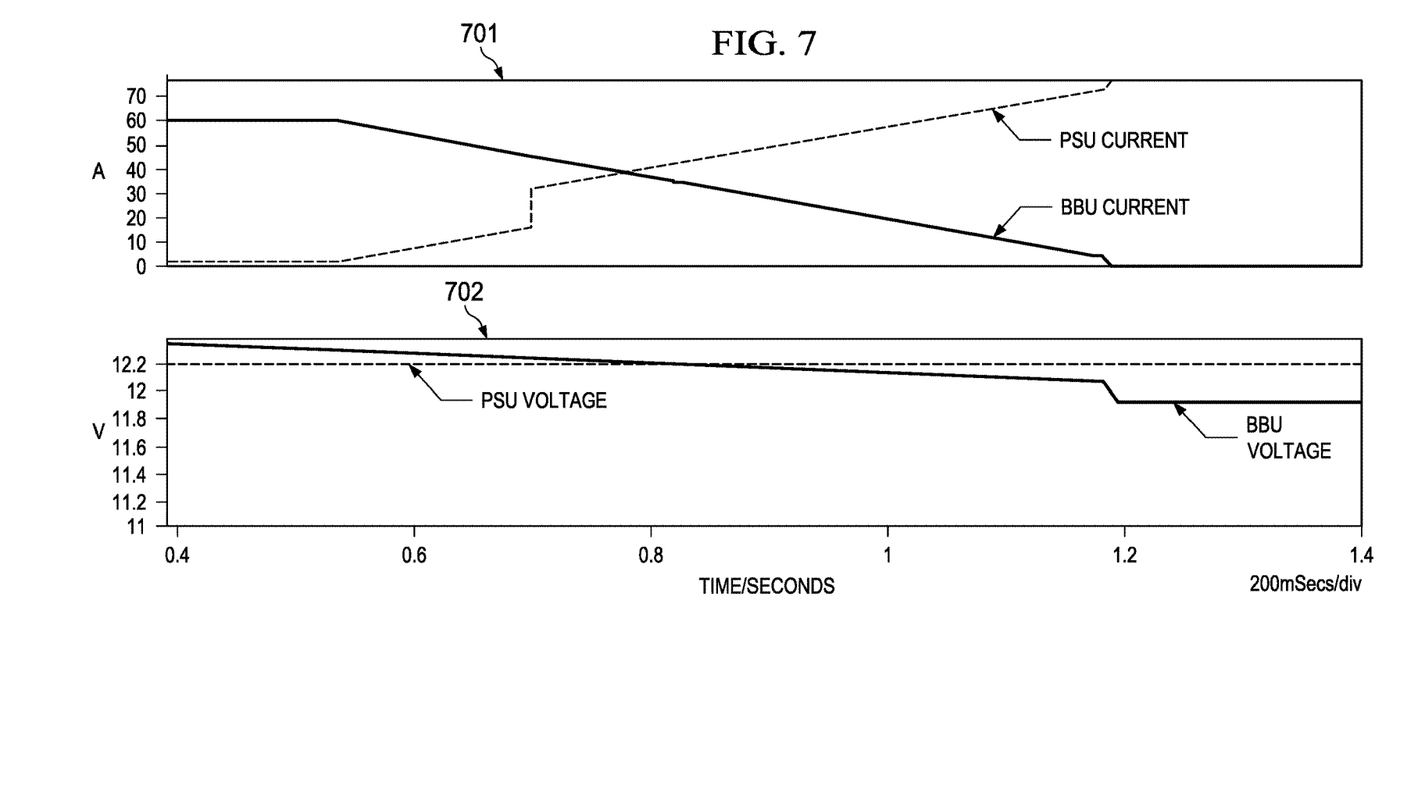

Load transition simulation waveforms based the foregoing techniques are shown in FIGS. 5-7. Particularly, FIG. 5 illustrates a linear load transition without any changes in node power consumption (i.e., by load 113), FIG. 6 illustrates a transition with a drop in node power consumption, and FIG. 7 illustrates a transition with an increase in node power consumption. Each of FIGS. 5-7 includes PSU and BBU output currents in graphs 501, 601, and 701; as well as PSU and BBU output voltages in graphs 502, 602, and 702, corresponding to the three respective power consumption scenarios.

It should be noted that if there is any computing node power change during the walk-in period (e.g., 10 s), both PSUs and BBUs will respond to such a transient, but their response does not affect the stability of the system and the total load transition profile for a data center. The current of PSU/BBU shows non-monotonicity during that load change, but after that, they still change linearly. In should be kept in mind that the BBU's internal voltage reference is designed to never go up in this transition period. As shown in graphs 502, 602, and 702, the output voltage of the PSU never goes up.

Additionally or alternatively, the BBU's output current can also be controlled by controlling the output voltage of the BBU in a desired fashion. For example, to achieve a linear load transition for PSU/BBU, referring back to FIG. 3, it is also possible to linearly decrease the BBU's output voltage during the walk-in period from, for example, ~12.4 V to ~12.1 V.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 8:
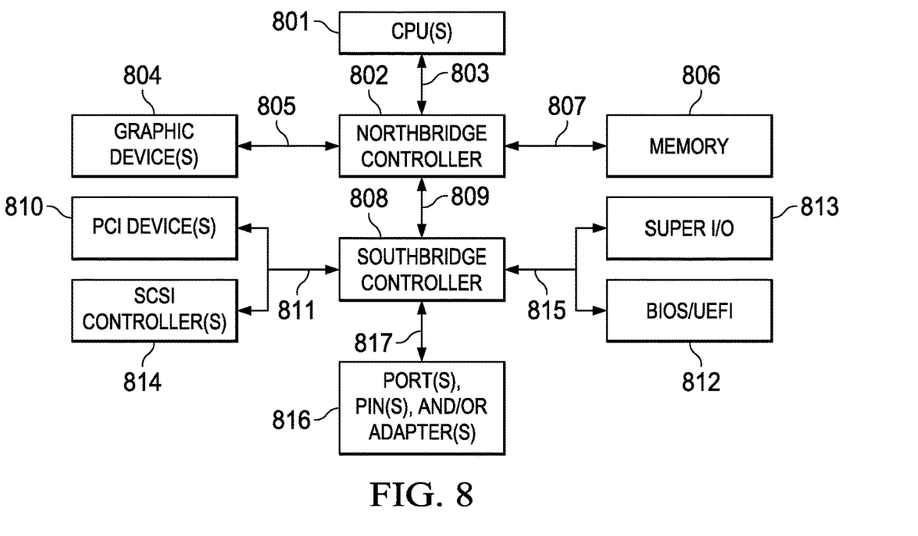
FIG. 8 is a block diagram of an example of an Information Handling System (IHS) according to some embodiments.

To illustrate this, is a block diagram of an example of an IHS according to some embodiments. As depicted, an IHS may include one or more CPUs 801. In various embodiments, an IHS may be a single-processor system including one CPU or a multi-processor system including two or more CPUs (e.g., two, four, eight, or any other suitable number). CPU(s) 801 may include any processor capable of executing program instructions.

For example, in various embodiments, CPU(s) 801 may be general purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 801 may commonly, but not necessarily, implement the same ISA.

In certain embodiments, CPU(s) 801 are coupled to northbridge controller or chipset 801 via front-side bus 803. Northbridge controller 802 may be configured to coordinate I/O traffic between CPU(s) 801 and other components. For example, in the illustrated embodiment, northbridge controller 802 is coupled to graphics device(s) 804 (e.g., one or more video cards or adaptors) via graphics bus 805 (e.g., an Accelerated Graphics Port or AGP bus, a Peripheral Component Interconnect or PCI bus, or the like).

Northbridge controller 802 may also be coupled to system memory 806 via memory bus 807. According to various embodiments, memory 806 may be configured to store program instructions, and/or data accessible by CPU(s) 801. In various embodiments, memory 806 may be implemented using any suitable memory technology, such as static RAM (SRAM), synchronous dynamic RAM (SDRAM), nonvolatile/Flash-type memory, or any other type of memory.

Northbridge controller 802 may be coupled to southbridge controller or chipset 808 via internal bus 809. Southbridge controller 808 may be configured to handle various I/O capabilities supported by an IHS, and it may provide interfaces such as, for instance, Universal Serial Bus (USB), audio, serial, parallel, Ethernet, or the like via port(s), pin(s), and/or adapter(s) 816 over bus 817. For example, southbridge controller 808 may be configured to provide trusted communications between an IHS and remote analytics service.

In various embodiments, southbridge controller 808 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol. As described, the I/O capabilities of an IHS may be utilized to interface via a networking protocol with a remote analytics service.

Southbridge controller 808 may also enable connection to one or more keyboards, keypads, touch screens, scanning devices, voice or optical recognition devices, or any other devices suitable for entering or retrieving data. Multiple I/O devices may be present in an IHS. In some embodiments, I/O devices may be separate from an IHS and may interact with an IHS through a wired or wireless connection.

As shown, southbridge controller 808 may be further coupled to one or more PCI devices 810 (e.g., modems, network cards, sound cards, video cards, etc.) and to one or more SCSI controllers 814 via parallel bus 811. Southbridge controller 808 may also be coupled to Basic I/O System (BIOS)/UEFI 812 and to Super I/O Controller 813 via Low Pin Count (LPC) bus 815.

Super I/O Controller 813 may combine interfaces for a variety of lower bandwidth or low data rate devices. Those devices may include, for example, floppy disks, parallel ports, keyboard and mouse, environmental sensors and fan speed monitoring/control, among others.

BIOS/UEFI 812 may include non-volatile memory having program instructions stored thereon. Those instructions may be usable CPU(s) 801 to initialize and test other hardware components and/or to load an Operating System (OS) for operation of an IHS. The BIOS/UEFI 812 initializes and tests the hardware components of an IHS, executes any pre-boot processes, such as Dell ePSA diagnostic processes in certain embodiments, and loads a boot loader or an OS from a memory device. The BIOS/UEFI 812 provides an abstraction layer for the hardware which enables software executed by the IHS to interact with certain I/O devices such as keyboards, displays, etc. Incidentally, the Unified Extensible Firmware Interface (UEFI) was designed as a successor to BIOS to address certain technical issues. As a result, modern IHSs predominantly use UEFI firmware and the term BIOS, as used herein, is intended also encompass UEFI firmware and future variations thereof.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 800 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, a northbridge controller may be combined with a southbridge controller and/or be at least partially incorporated into the CPU(s). In other implementations, one or more of the devices or components shown in FIG. 8 may be absent, or one or more other components may be added. Accordingly, systems and methods described herein may be implemented or executed with other IHS configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system, comprising:
   a Power Supply Unit (PSU) coupled to an Information Handling System (IHS) via a power transmission interface;
   a Backup Battery Unit (BBU) coupled to the IHS via the power transmission interface in parallel with the PSU; and
   a controller within the BBU, the controller configured to:
      determine that the PSU has turned off;
      allow the BBU to supply all current consumed by the IHS via the power transmission interface while the PSU is turned off;
      detect that the PSU has turned back on; and
      in response to the detection, reduce an internal reference of the BBU such that an output current of the BBU is decreased linearly and an output current of the PSU is increased linearly.

2. The system of claim 1, wherein the internal reference of the BBU is a voltage reference.

3. The system of claim 1, wherein the internal reference of the BBU is a current reference.

4. The system of claim 1, wherein to determine that the PSU has turned off and to detect that the PSU has turned back on, the controller is configured to monitor the status of a digital signal provided by a logic circuit distinct from the BBU and the PSU.

5. The system of claim 1, wherein the controller is further configured to, in response to the determination, raise an internal voltage reference of the BBU to a value greater than an internal voltage reference of the PSU.

6. The system of claim 5, wherein the controller is further configured to begin raising the internal reference of the BBU after waiting for a predetermined period of time greater than a hold up time of the PSU.

7. The system of claim 1, wherein the controller is further configured to shut down the BBU in response to the output current of the BBU reaching a minimum value.

8. A memory storage device having program instructions stored thereon that, upon execution by a controller within a Backup Battery Unit (BBU) of an Information Handling System (IHS), cause the BBU to:
   determine that a Power Supply Unit (PSU) has turned off;
   supply all current consumed by the IHS while the PSU is turned off;
   detect that the PSU has turned back on; and
   in response to the detection, reduce an internal reference of the BBU such that an output current of the BBU is decreased linearly and an output current of the PSU is increased linearly.

9. The memory device of claim 8, wherein the internal reference of the BBU is a current reference.

10. The memory device of claim 8, wherein to determine that the PSU has turned off and to detect that the PSU has turned back on, the program instructions, upon execution by the controller, further cause the BBU to monitor the status of a digital signal provided by a logic circuit distinct from the BBU and the PSU.

11. The memory device of claim 8, wherein the internal reference of the BBU is a voltage reference.

12. The memory device of claim 11, wherein the program instructions, upon execution by the controller and in response to the determination, cause the internal voltage reference of the BBU to be raised to a value greater than an internal voltage reference of the PSU.

13. The memory device of claim 12, wherein the program instructions, upon execution by the controller, cause the internal voltage reference of the BBU to begin rising after waiting for a predetermined period of time greater than a hold up time of the PSU.

14. The memory device of claim 8, wherein the program instructions, upon execution by the controller, cause the BBU to shut down in response to the output current of the BBU reaching a minimum value.

15. A method performed by a controller within a Backup Battery Unit (BBU) of an Information Handling System (IHS), the method comprising:
   determining that a Power Supply Unit (PSU) has turned off;
   supplying all current consumed by the IHS while the PSU is turned off;
   detecting that the PSU has turned back on; and
   in response to the detection, reducing an internal voltage reference of the BBU such that an output current of the BBU is decreased linearly and an output current of the PSU is increased linearly.

16. The method of claim 15, wherein the internal reference of the BBU is a voltage reference.

17. The method of claim 16, wherein determining that the PSU has turned off and detecting that the PSU has turned back on includes monitoring the status of a digital signal provided by a logic circuit distinct from the BBU and the PSU.

18. The method of claim 16, wherein the program instructions, upon execution by the controller and in response to the determination, cause the internal voltage reference of the BBU to be raised to a value greater than an internal voltage reference of the PSU.

19. The method of claim 18, further comprising causing the internal voltage reference of the BBU to begin rising after waiting for a predetermined period of time greater than a hold up time of the PSU.

20. The method of claim 15, further comprising causing the BBU to shut down in response to the output current of the BBU reaching a minimum value.

* * * * *